Feb. 25, 1964 R. L. WEIR 3,122,342
ROTARY FOIL TYPE AIRCRAFT
Filed May 21, 1957 9 Sheets-Sheet 1

INVENTOR.
Richard L. Weir

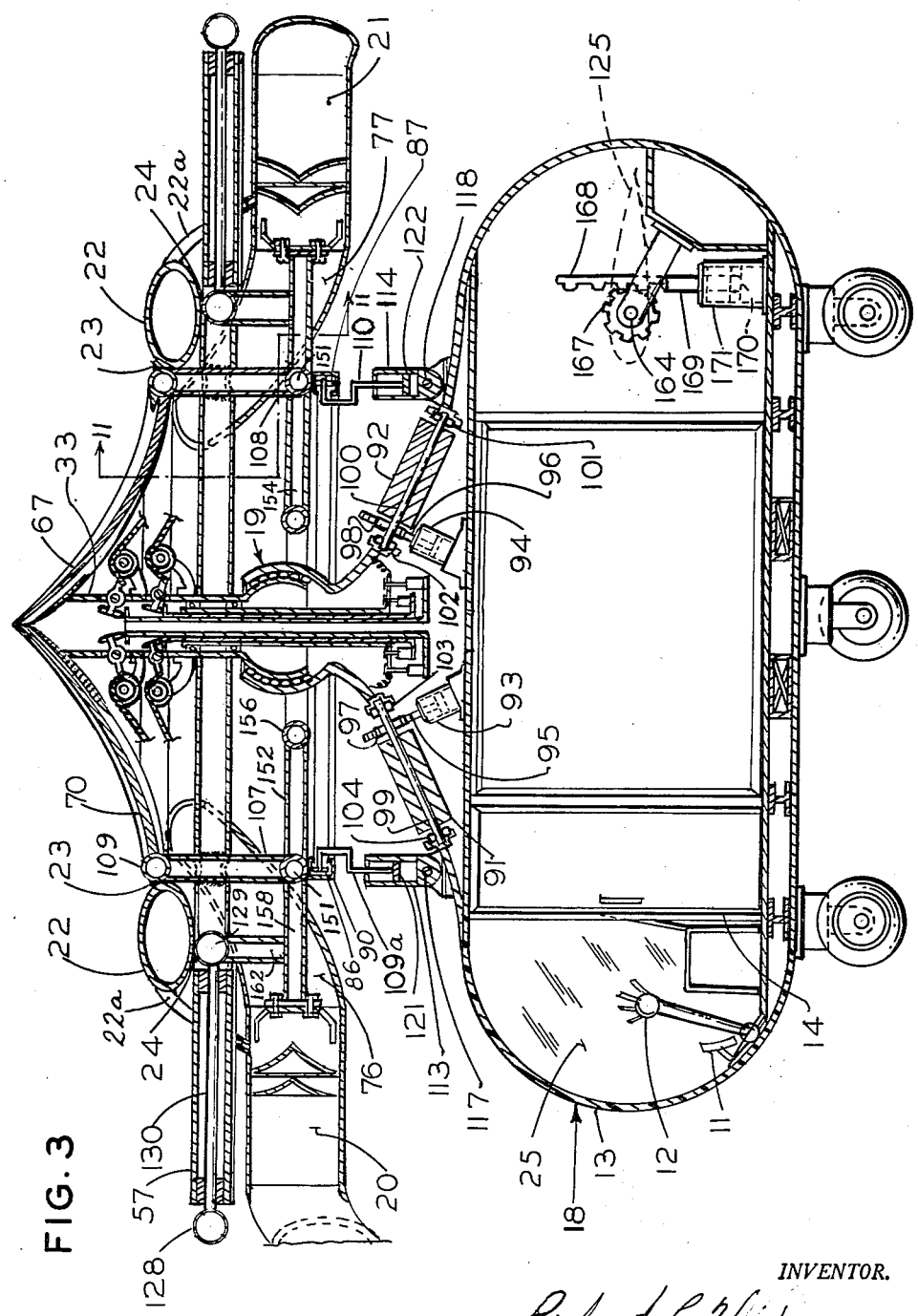

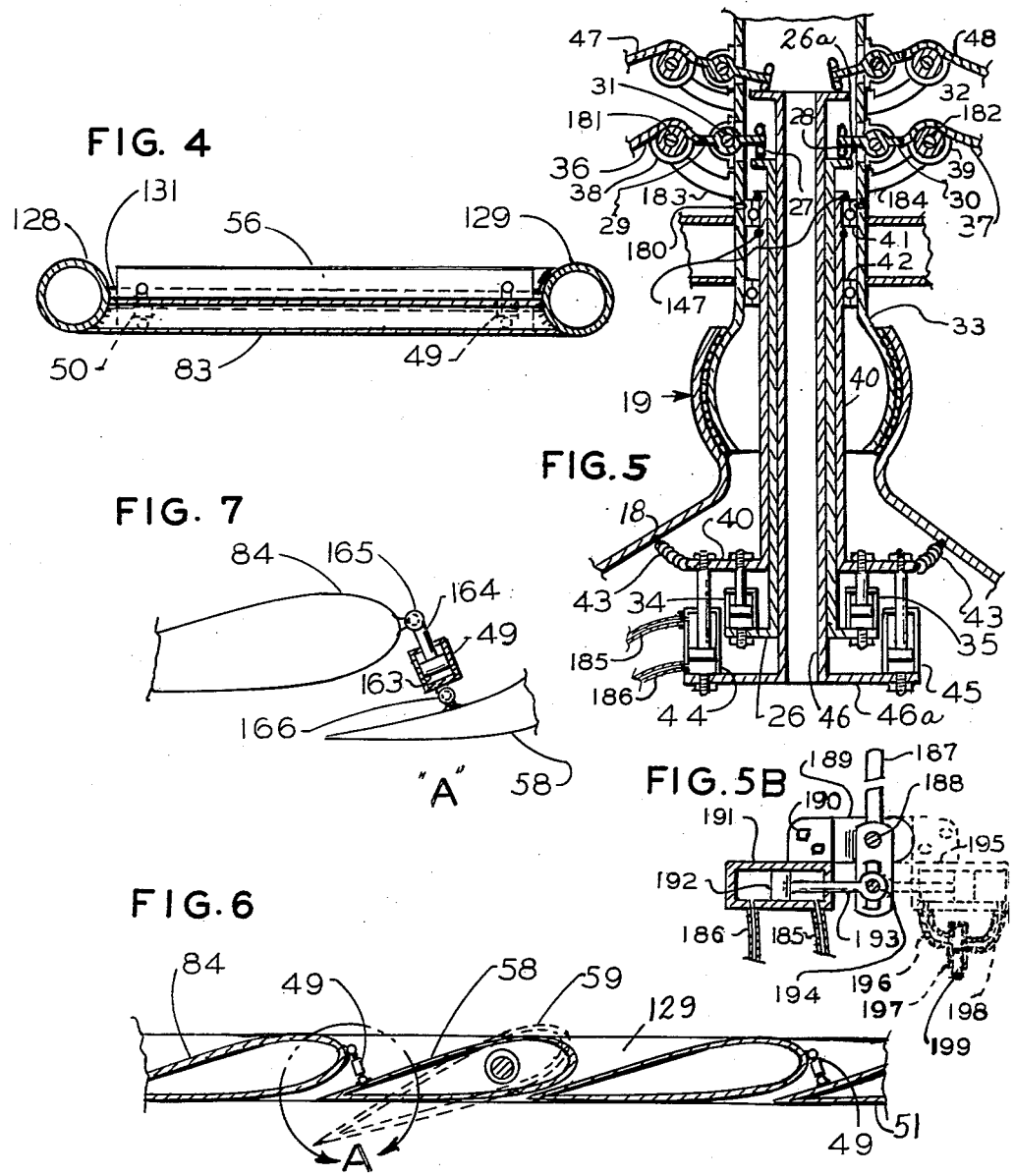

INVENTOR.
Richard L. Weir

Feb. 25, 1964 R. L. WEIR 3,122,342
ROTARY FOIL TYPE AIRCRAFT
Filed May 21, 1957 9 Sheets-Sheet 6

INVENTOR.
Richard L. Weir
by Robert R. Candor
his attorney

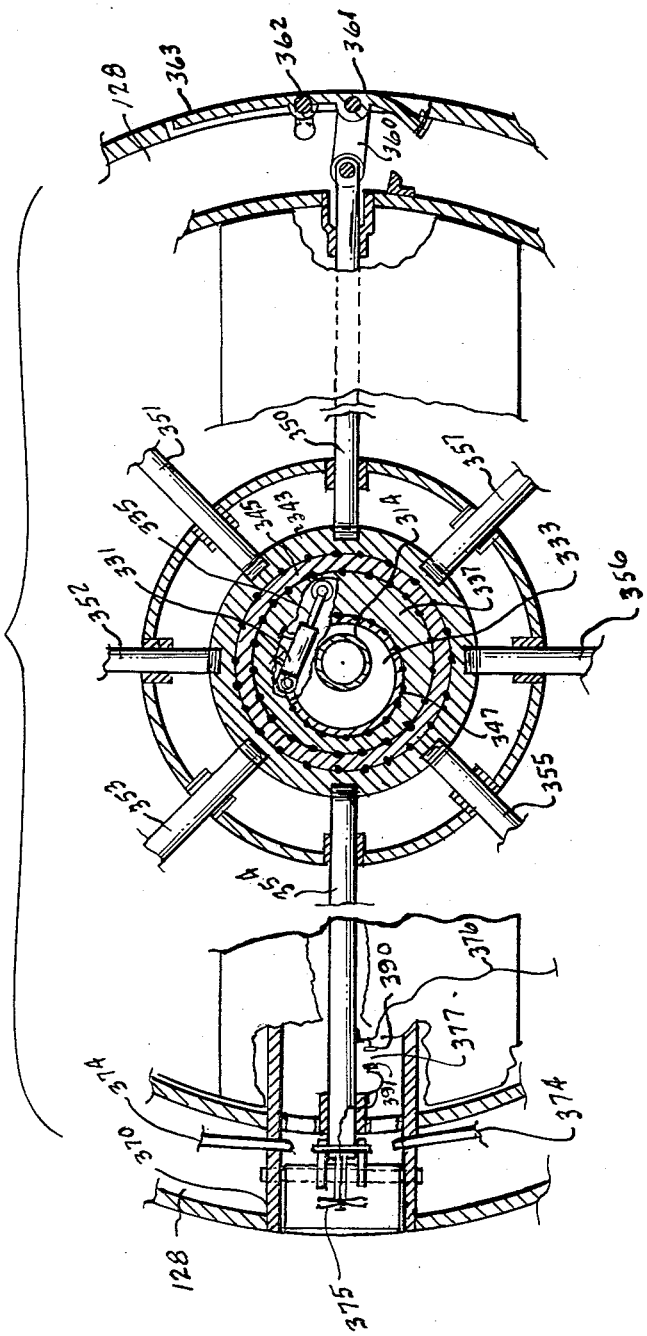

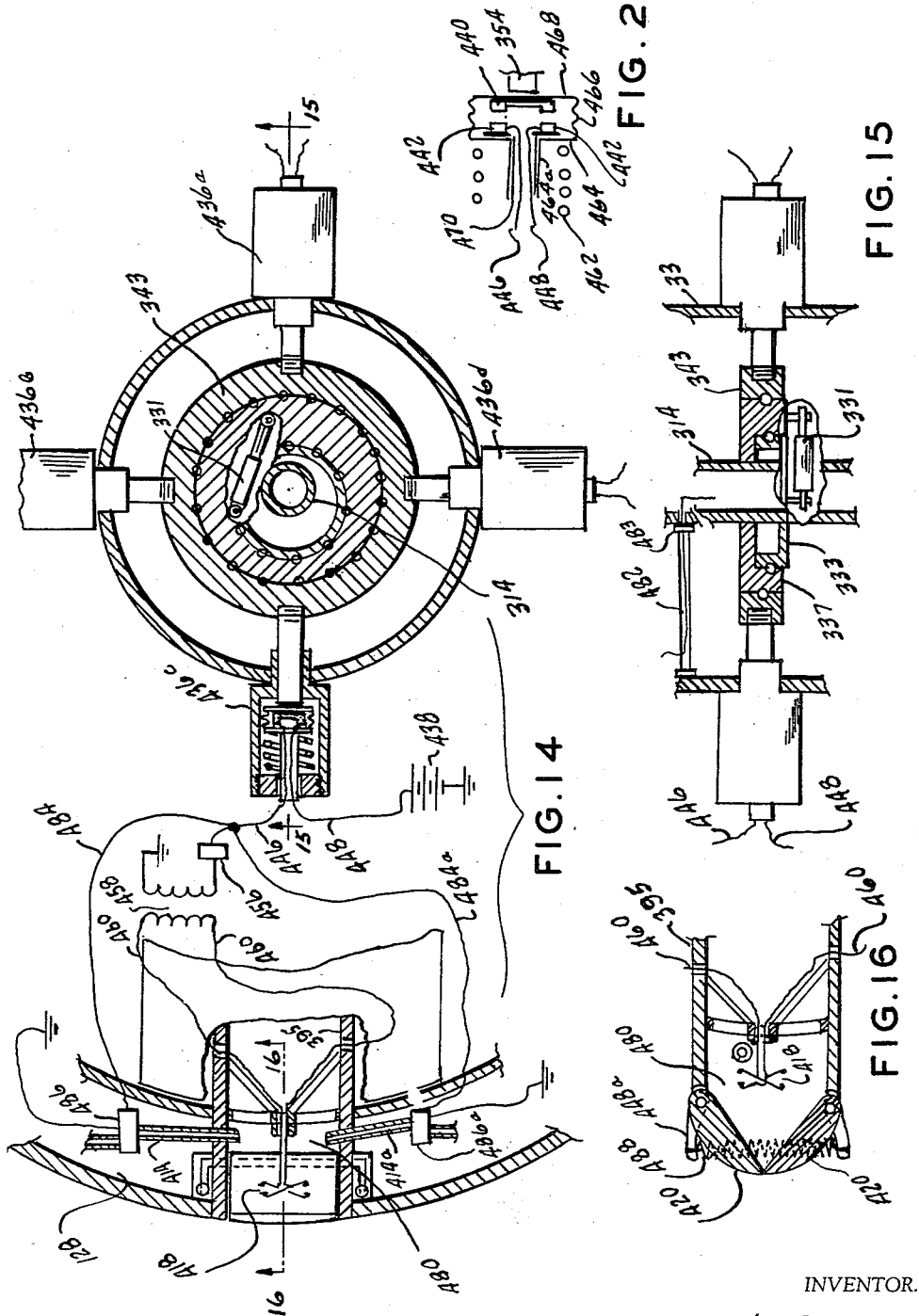

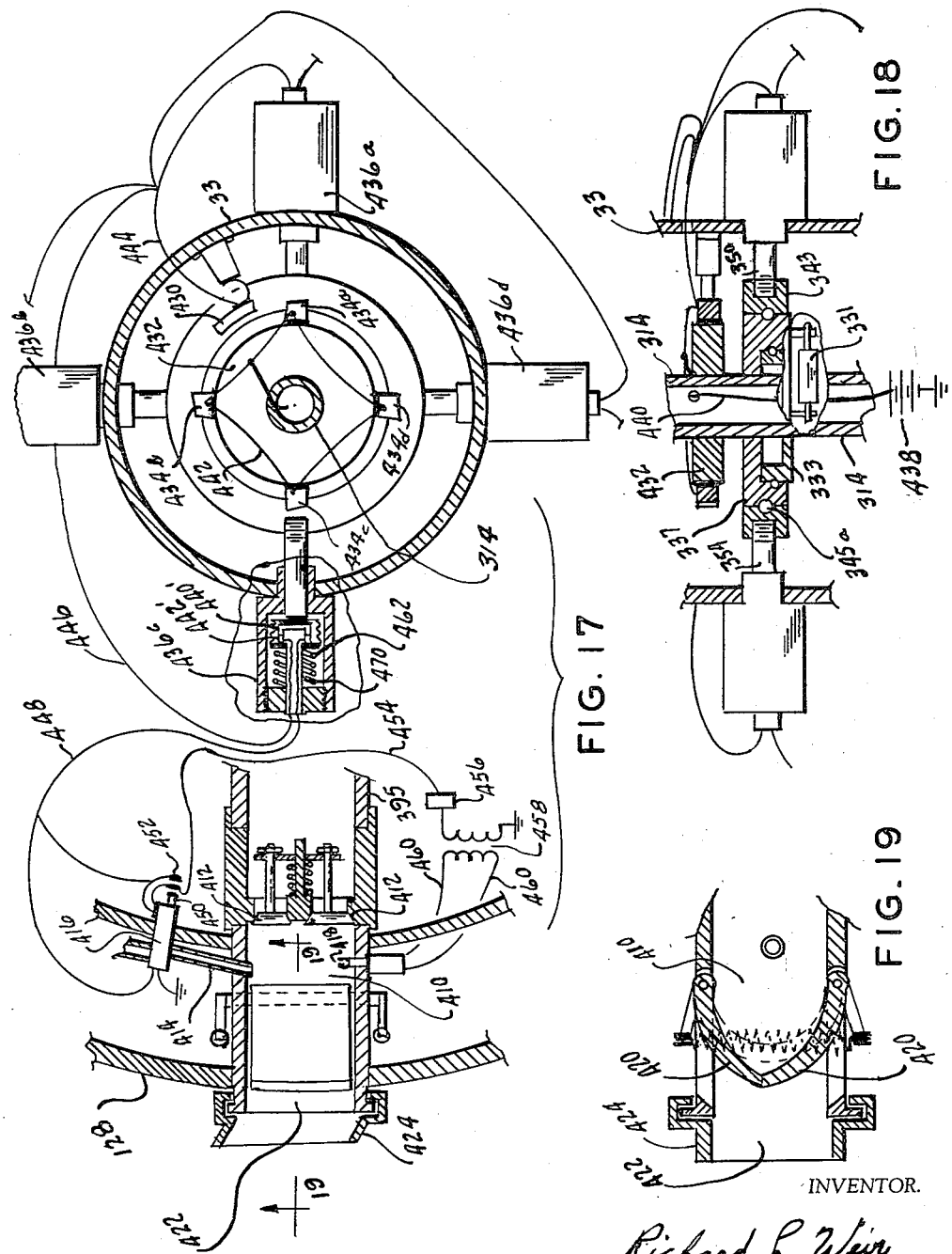

United States Patent Office 3,122,342
Patented Feb. 25, 1964

3,122,342
ROTARY FOIL TYPE AIRCRAFT
Richard Lloyd Weir, 75 Sinclair Ave., Dayton 5, Ohio
Filed May 21, 1957, Ser. No. 660,625
15 Claims. (Cl. 244—17.11)

This invention relates to a new concept in rotary foil type aircraft.

An important object of the invention is to provide a specially designed turbine wheel or fan in combination with a surrounding shutter type rotating foil. Both the fan and the shutter type rotating foil, when alternate shutters are open, act as lift producing mechanisms.

A further object of my invention is to provide a shutter type rotating foil which, when shutters are open or closed, acts as a gyroscopic disc.

A further object of my invention is to provide an air machine incorporating a gyroscopic unit which, when acted upon by a force at an angle to the plane of rotation of the gyro, will drive the air machine in directional flight.

A further object of the invention is to use a gyroscopic disc as a source for horizontal directional force for flight by the application of force at substantially a right angle to the plane of rotation of the disc, in the preferred embodiment using the force of gravitation in the weight of the aircraft body; a portion of which can be applied at essentially a right angle to the plane of rotation of the gyroscopic unit.

A further object of the invention is to utilize part of the flow of air generated by a specially designed fan or impeller as an air ram for turbo-jet engines (or other type propulsion device requiring ram air) which may be used to drive the gyro to propel the air machine and produce lift.

A further object of the invention is to utilize fins that protrude out of the structure of the air machine into the air flow which may be adjusted independently, as to the amount of blade protruding into the air flow, to counteract the inertia produced by the rotating section of the machine and stabilize the machine.

A further object of the invention is to provide a pair of independently operated horizontal stabilizers to react against air flow to increase or decrease the effect of a force acting on a gyro used to furnish the drive required to produce directional flight, and to stabilize the air machine in directional flight.

A further object is to provide a ball type joint between the rotor and the body of the machine so that the rotor may rotate independently of the body and in planes of rotation at varying angles to the body.

Another object is to provide a central control tube extending through the main ball joint and mounted on bearings in the upper (rotating) section of the machine through which control tubes slide one within another to control the engine, and the hydraulic cylinders which actuate the movable blade sections in the gyroscopic disc.

A further object of the invention is to provide means for centering the controls which induce force on the centrifugal-direction fan and gyroscopic air foil section while the air machine is in the air and the body of the air machine is in a state of equilibrium before force is applied to the gyro which in turn will furnish drive for directional flight.

Still another object of the invention is to provide an air machine with large doors on each side which may be lowered to act as ramps and provide a through-way drive through the machine for easy loading and unloading of men and materials.

A further object of the invention is to utilize fins in the air flow produced by the ducted fan portion of the machine to initiate and assist directional flight.

Another object of this invention is to provide a double eccentric to control the operation of the rotating disc and rotating combustion means.

Another object is to provide an electric distribution system controlled by the double eccentric to select complete circular combustion or partial arc combustion.

Another object is to provide an electric system controlled by a central distribution construction to produce intermittent combustion along the periphery of the disc and at a selected arc or arcs thereof.

Another object is to provide an electric system to provide a continuous or sustained fuel combustion around the periphery of the disc or at a selected arc or arcs thereof.

Another object is to provide for opening of the foils in the disc during certain part or parts of revolution to provide side thrust or tilt.

Other important objects and advantages of the invention will become apparent during the course of the following description.

In the accompanying drawings forming a part of this application, and in which like numerals are employed to designate like parts throughout the same, FIGURE 1 is a plan view of my air machine, showing the centrifugal-directional fan and gyroscopic air foil unit, with cut-away sections and other details.

FIGURE 3 is a vertical cross section of my invention, taken along line 3—3 in FIGURE 1.

FIGURE 4 is a vertical cross section of a fixed air foil, taken along line 4—4 in FIGURE 1.

FIGURE 5 is a vertical cross section, taken along the line 5—5 in FIGURE 1, showing the ball joint pass through control system.

FIGURE 5B is a cross section view showing the control portion of a typical closed hydraulic system with phantom lines showing typical control equalizing by-pass system and twin cylinder arrangement.

FIGURE 6 is a vertical transverse section of a portion of the gyroscopic air foil unit of my invention, taken along the line 6—6 in FIGURE 1.

FIGURE 7 is an enlarged view at "A" in FIGURE 6, showing a typical air foil control cylinder with mounts.

FIGURE 13 is a horizontal cross section taken along the line 13—13 of FIGURE 12.

FIGURE 14 is a view somewhat similar to FIGURE 13 showing an electric system for controlling substantially constant or sustained combustion at the periphery of the ring.

FIGURE 15 is a vertical cross section along the central portion of FIGURE 14.

FIGURE 16 is a vertical cross section taken along the line 16—16 of FIGURE 14.

FIGURE 17 is a horizontal cross section of an electrical system for producing intermittent combustion impulses at the periphery of the disc.

FIGURE 18 is a vertical cross section taken along the central portion of FIGURE 17.

FIGURE 19 is a vertical cross section taken along the line 19—19 of FIGURE 17.

FIGURE 20 is a slightly enlarged view of a portion of the contact breakers shown in FIGURES 14, 15, 17 and 18.

Figure 1:
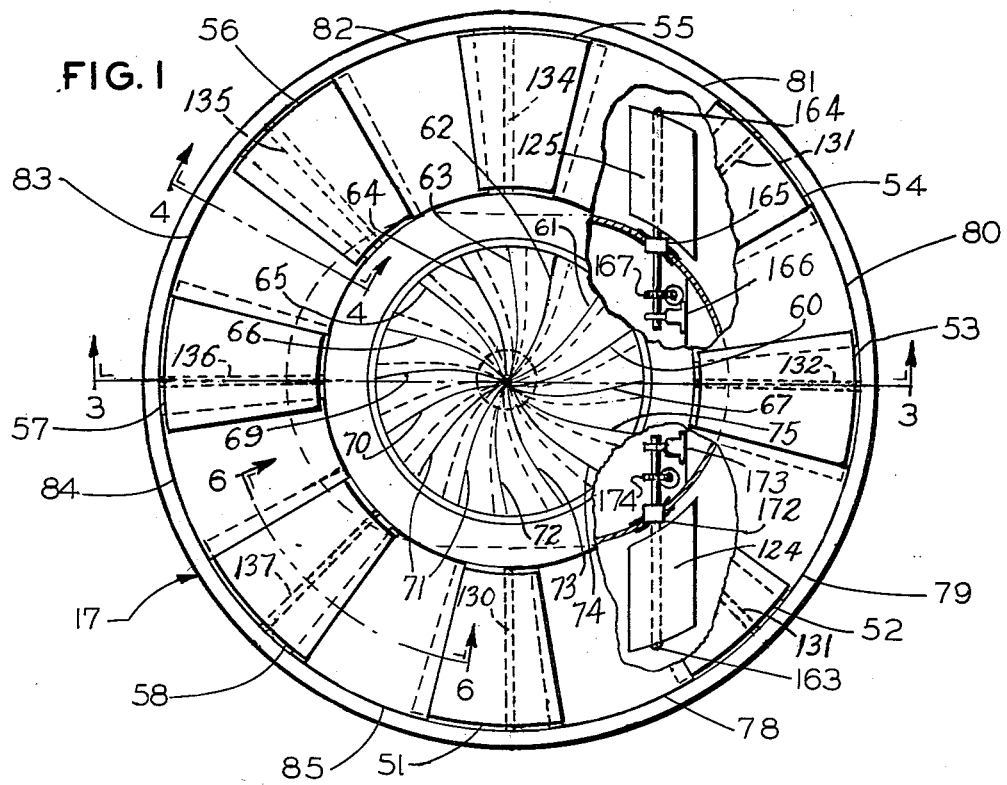

In the drawings, where for the purpose of illustration is shown a preferred embodiment of my invention. The numeral 17 (FIGURES 1 and 2) indicates the centrifugal-directional fan and gyroscopic air foil section mounted above the body section 18 and connected thereto by free floating ball joint 19 (FIGURES 3, 5 and 12) which allows the fan and air foil section 17 to rotate independently of the body section 18. Mounted below the fan and air foil section 17 at opposite sides thereof are two turbo-jet engines 20 and 21, which furnish power to rotate the fan and air foil section 17. The fuel supply for the engines is contained in circular fuel tank 22 (FIGURE 3) which is structurally attached to the fan and air foil section at points 23 and 24. Fuel is fed to the engines by tubes 22a under suitable valve control. Engine starting and fuel flow are controlled through a closed hydraulic system described as a typical closed hydraulic system later in the specification through actuating cylinders 34 and 35 from body cabin 25 actuating the sliding pass through tube 26 (FIGURE 5). The upper end of tube 26 actuates ball bearing wheels 27 and 28 which rotate freely around attached arms 29 and 30 which are in turn pivoted to actuate in a plane perpendicular to horizontal pins 31 and 32, which are mounted in cut-out sections in tubular structural section 33. The rims of ball bearing wheels 27 and 28 ride on the upper flange 26a of ball joint sliding pass-through-tube 26.

*Control of Engines 20 and 21*

Attached to ends of arms 29 and 30 (FIGURE 5) are spring loaded cables 36 and 37 which run over pulleys 38 and 39, which are mounted to rotate freely on pins 181 and 182 which are attached to structural units 183 and 184 which are in turn attached to tubular structural section 33. Sliding tube 26 is surrounded by tubular case 40 which is mounted within tubular structural section 33 on thrust ball bearings 41 and 42 so that tubular structural section 33 may rotate independently of the tubular case 40, but may not move vertically with relation to tubular case 40, bearings 41 and 42 being pressed within tubular structural section 33 and on tubular case 40 and held from vertical movement by snap rings 147 and pins 180.

Tubular case 40 (FIGURE 5) is held from rotation with relation to body 18 by means of springs 43. Thus, by actuating the pistons within cylinders 34 and 35, which are attached to tubular case 40, and the sliding pass-through tube 26, motion is transferred to cables 36 and 37 for control of operation of engines 20 and 21.

*Control of Foils 51–58 and 78–85*

In like manner cables 47 and 48 are moved by actuation of pistons within cylinders 44 and 45, (FIGURE 5) which are attached to the lower flange 46a of inner pass-through-tube 46 and to the tubular case 40 respectively, and are actuated through a typical closed hydraulic system described later in the specification, from the cabin body 25. This structure will transfer motion to cables 47 and 48 to move actuators of typical closed hydraulic systems for control of actuating pistons in air foil control cylinders 49 and 50 (FIGURES 4, 6 and 7), which are identical and typical of cylinders mounted in the same relative positions on fixed foils 78, 79, 80, 81, 82, 83, 84 and 85, (FIGURES 1, 4, 6 and 7) and attached to adjustable air foils 51, 52, 53, 54, 55, 56, 57 and 58. The fixed foils 78–85 may be the structural supports between rings 128 and 129 and may be welded thereto. Alternatively additional support rods, not shown, may be used to hold the two rings 128 and 129 together.

A typical air foil control cylinder installation as shown in FIGURE 7 is described as follows:

Air foil control cylinder 49 contains piston 163 attached to connecting rod 164 which in turn is connected through foil ball joint 165 to fixed foil 84. Air foil control cylinder 49 is connected on its lower extremity through lower foil ball joint 166 to adjustable air foil 58.

Figure 8:
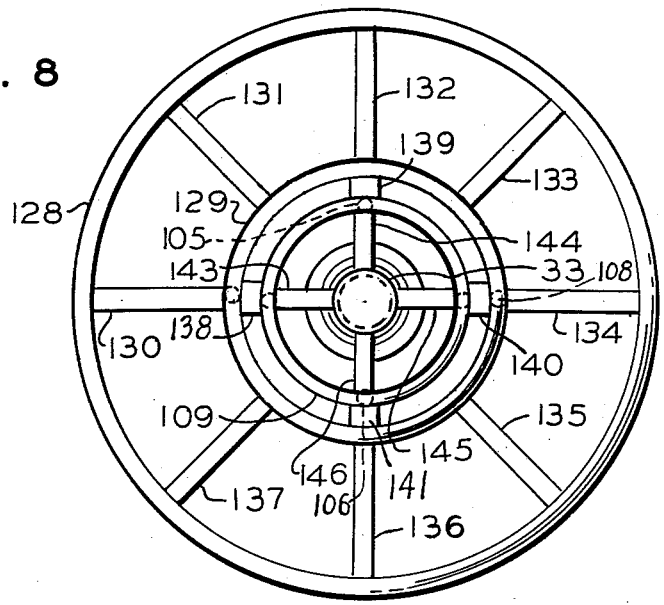
FIGURE 8 is a plan view of the basic structural section only of the centrifugal-directional fan and gyroscopic air foil section.
Figure 9:
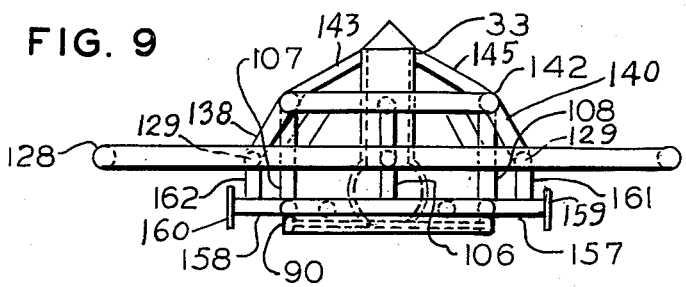
FIGURE 9 is a side view of the basic structural section shown in FIGURE 8.
Figure 10:
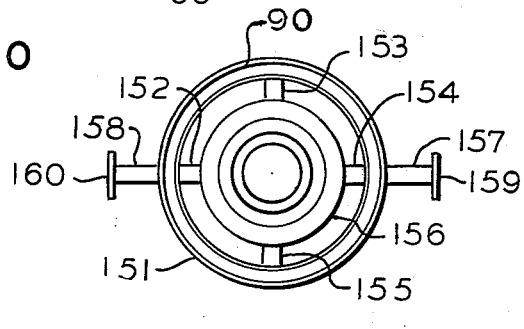
FIGURE 10 is a partial bottom view of the basic structural section shown in FIGURE 8.

Thus by moving a control in the cabin body 25, adjustable air foils 51, 52, 53, 54, 55, 56, 57 and 58, which are mounted to rotate on movable foil pass through rods 130, 131, 132, 133, 134, 135, 136 and 137 respectively, (FIGURES 1, 6 and 8) may be opened simultaneously to the full open foil position, (indicated by dotted lines 59 in FIGURE 6) or moved simultaneously to any foil position between full open and a closed position as indicated by position of foil 58 in FIGURE 6.

*The Rotating Structure, in General*

Figure 2:
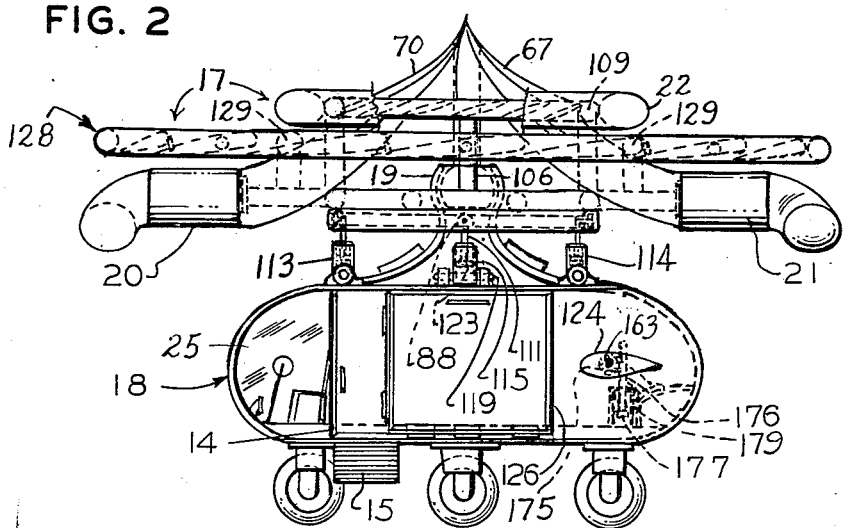
FIGURE 2 is a side elevation of my air machine.

The rotating structure, as a whole, is designated by the numeral 17. Its "foil" structure includes outer tubular ring 128 and inner tubular ring 129 (FIGURES 3 and 8–10). The fuel tank 22 has its bottom secured to the ring 129 and its side secured to the tubular fan ring 109. The rings 129 and 109 are structurally secured together by a plurality of upwardly slanting support rods or plates 138, 139, 140 and 141, which may also be used to support the fuel tank 22. The top of mast 33 may be structurally connected to the fan tube 109 by support rods or plates 143, 144, 145 and 146 (FIGURES 8 and 9) and/or by the fan blades 60–75 (FIGURES 1–3). The ring 109 supports the ring 151 by means of the vertical tubes or rods 105–108. The ring 151 supports the C ring 90. The ring 109 also supports the ring 156 by radial tubes 152–155. The engines 20 and 21 are supported from ring 151 by the radial tubes 157 and 158, which may be attached to the engines by any suitable means diagrammatically indicated at 159 and 160 in FIGURES 9 and 10. The radial tubes 157 and 158 are connected to the ring 129 by the vertical tubes 161 and 162.

Figure 11:
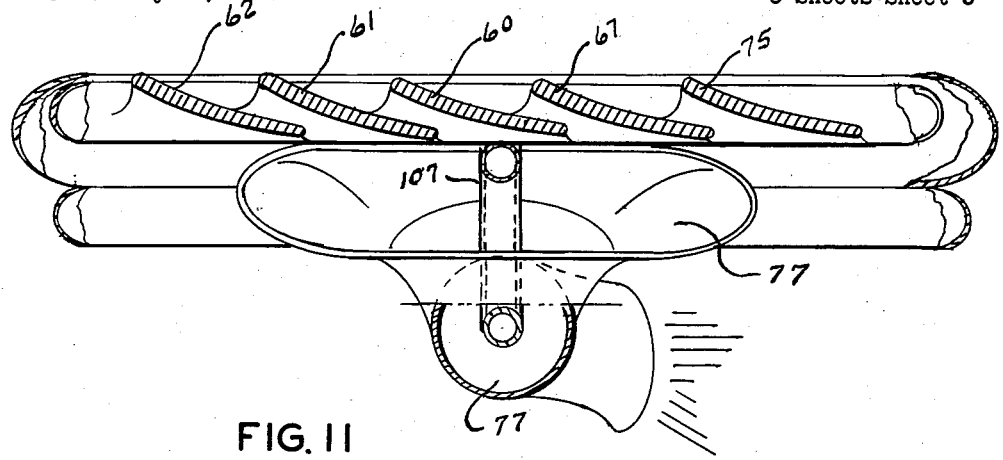
FIGURE 11 is a cross section along the line 11—11 of FIGURE 3.

The lift fan comprises fan blades 60, 61, 62, 63, 64, 65, 66, 67, 68, 69, 70, 71, 72, 73, 74, and 75 (FIGURES 1 and 11) to direct air downwardly (to furnish lift) and centrifugally into turbine inlets 76 and 77 (FIGURES 3 and 11) to furnish centrifugally compressed air for turbine engines 20 and 21. The fan blades 60–75 are connected to mast 33 and fan ring 109.

*The Lift and Horizontal Directional Forces*

Movable air foil sections 51 through 58 between rings 128 and 129 are fully open for direct vertical lift and may be partially or fully closed when the centrifugal-directional fan and air foil section is acting as a gyroscopic wheel in directional flight. To establish vertical flight, turbo-jet engines 20 and 21, which are attached structurally to the fan and air foil section, are started and air blasts, predirected at an angle somewhat downward from the plane of rotation of the gyroscopic air foil section of the air machine, cause the centrifugal-directional fan and air foil section 17 to rotate while ball joint 19 allows body 18 to remain stationary. Inertia forces transferred to the body 18 of the machine through the ball joint 19 and reaction wheels 86, 87 (FIGURE 3) which ride in C track 90 are counteracted by adjustable control flaps 91 and 92 (FIGURE 3) which extend into the air flow over the top of body 18. Preferably there are four wheels 86 or 87 which are 90° apart. Control flaps 91 and 92 are actuated by pistons 95 and 96 by means of a typical closed hydraulic system as described later in the specification from the body cabin 25 to pistons in control cylinders 93 and 94 through racks 95 and 96 and gears 97 and 98 which are mounted on rods 99 and 100, which run through adjustable control flaps 91 and 92 and are fixedly attached thereto. Rods 99 and 100 are supported by bearings 101, 102, 103 and 104, mounted in the skin of body 18.

Directional horizontal flight is attained by the application of force at right angles to the centrifugal-directional fan and gyroscopic air foil section. A preferred application is depicted as follows: Tubular structural units 105, 106, 107 and 108 (FIGURES 3, 8 and 9) are attached at the upper ends to the circular tube 109 and at the lower ends to circular tubular C rail support tube 151 which is in turn firmly attached to C track 90. Ball bearing type wheels 86, 87 (FIGURE 3) of which there are four 90° apart are attached and rotate freely on angularly formed rods 109a, 110 of which there are four 90° apart. Rods 109a, 110 have pistons attached at lower ends which operate within hydraulic cylinders 113, 114, of which there are four equally spaced 90° apart and mounted in like manner around the top of body 18. Four cylinders 113, 114 are mounted at the lower ends to pivot around rods 117, 118 of which there are four 90° apart. Rods 117, 118 are mounted in bearings on each side of cylinders 113 and 114 to move around pins 117 and 118 in the same plane and similar constructions occur 90° apart.

Hydraulic cylinders 113 and 114 which are 180° apart are connected to each other through a dual closed hydraulic system, a typical example of which is shown in FIGURE 5B (including dotted line position), actuated by controls in body cabin 25 in such a manner that when body cabin controls are moved so that hydraulic pressure is applied to the top of piston 121 in cylinder 113, pressure is at the same time applied to the bottom of piston 122 in cylinder 114, and likewise when pressure is applied to the top of piston 122, pressure is also applied to the bottom of piston 121. The same relative arrangement and actuation is applicable to the pistons at 90° to the plane of FIGURE 3.

To more fully illustrate this operation, it is necessary to describe the typical closed hydraulic systems referred to elsewhere in this specification and illustrated in FIGURE 5B as follows: Slotted handle 187 is mounted to rotate on pin 188 which is firmly attached to hydraulic actuator support 189. Also attached to hydraulic actuator support 189 by bolts 190 is cylinder 191. Within cylinder 191 is piston 192. Connected to piston 192 is piston rod 193. Connected rigidly near the opposite end of piston rod 193 and extending through a slot in slotted handle 187 is pin 194. Tubular hydraulic lines 185 and 186 are connected to cylinder 191 in FIGURE 5B and, for the purposes of this illustration, shown attached to cylinder 44 in FIGURE 5. With hydraulic fluid filling the system it is evident (in viewing FIGURES 5 and 5B) that by moving handle 187 to the right or left piston 192 would be moved within cylinder 191 and the piston within cylinder 44 would be acted upon forcing cylinder 44 downward or upward activating inner sliding-pass-through tube 46. This type of control is applied to all hydraulic controls herein disclosed.

The dual installation for the operation of pistons 121 and 122 within cylinders 113 and 114 (FIGURE 3) is accomplished by (as illustrated with dotted lines in FIGURE 5B) attaching cylinder 195 (with piston identical to 192 and connecting rod similar to connecting rod 193 and attached thereto) to hydraulic actuator 189. Hydraulic lines 185, 186 and 196, 198 would be attached to the fluid filled portions of the cylinders 113 and 114 respectively at similar ends of the pistons thus connecting cylinders 191 and 113 and also 195 and 114. Actuation of the slotted handle would then move both the pistons in the cylinders 191 and 195 in the actuator, and the pistons 121 and 122 in cylinders 113 and 114, simultaneously. Actuation of pistons within cylinders on a plane 90° to FIGURE 3 would be similarly controlled. A typical bypass for the cabin control cylinders used in conjunction with cylinders 113, 114 is also illustrated in FIGURE 5B. Tubular lines 196 and 198 are attached to opposite ends of cylinder 195 and opposite sides of by-pass sliding plunger type valve 197. Plunger 199 slides out (to position shown) to allow by-pass of fluid to either end of piston 195 and is pushed in to stop by-pass of fluid. The same by-pass construction can be provided for piston 191.

In vertical or hovering flight by-pass valve 197 is opened in the normally closed hydraulic system which is used to actuate pistons 121, 122 in cylinders 113, 114, and in similar constructions on the 90° plane and body 18 floats freely on ball joint 19 to assume a position of equilibrium. Cabin controls for applying force to gyro are then centered and by-pass is closed. Actuation of the control system to exert force on piston 121 and an opposite force on piston 122 and the pistons at right angles thereto will now exert force at substantially right angles to the centrifugal-directional fan and gyroscopic air foil section 17 which will then assume horizontal-directional motion.

Rudder type air foil sections 124 and 125 (FIGURES 1 and 2) are attached to and surround horizontal pass-through-rods 163 and 164 respectively. Horizontal rudder pass-through-rod 164 is mounted to rotate freely in bearings 165 and 166 which are firmly mounted in structural supports in body 18. Spur gear 167 is mounted on and firmly attached to horizontal rudder pass-through-rod 164. Rack 168 is attached to piston 170 which moves within cylinder 171. A typical closed hydraulic system described previously herein, controlled from the body cabin is utilized to actuate piston 170 and move air foil 125.

In a similar manner, as illustrated in FIGURE 1 and FIGURE 2, horizontal rudder pass-through rod 163 is mounted to rotate freely in bearings 172 and 173 which are firmly mounted in structural supports in body 18. Spur gear 174 is mounted on and firmly attached to horizontal rudder pass-through-rod 163. Rack 175 is attached to piston rod 176 which is attached to piston 177, which moves within cylinder 179. A typical closed hydraulic system described previously herein, controlled from the body cabin 25, is utilized to actuate piston 177, and move air foil 124.

When forward directional motion is established, independently operated rudder type air foil sections 124 and 125 may be utilized to exert force on the centrifugal directional fan and gyroscopic air foil section 16 as required to maintain or increase the speed of the horizontal directional flight of the air machine.

Doors 126 and 127 (FIGURE 2) in body 18 are provided with hinges at the lower side and open down to provide ramps on both sides of the air machine, up which vehicles can be driven. Step 15 and door 14 provide entrance to cabin 25. Plexiglas 13 surrounds complete frontal area. Rudder type controls 11 and controls on pedestal 12 actuate closed hydraulic systems previously referred to in the specification.

Figure 12:
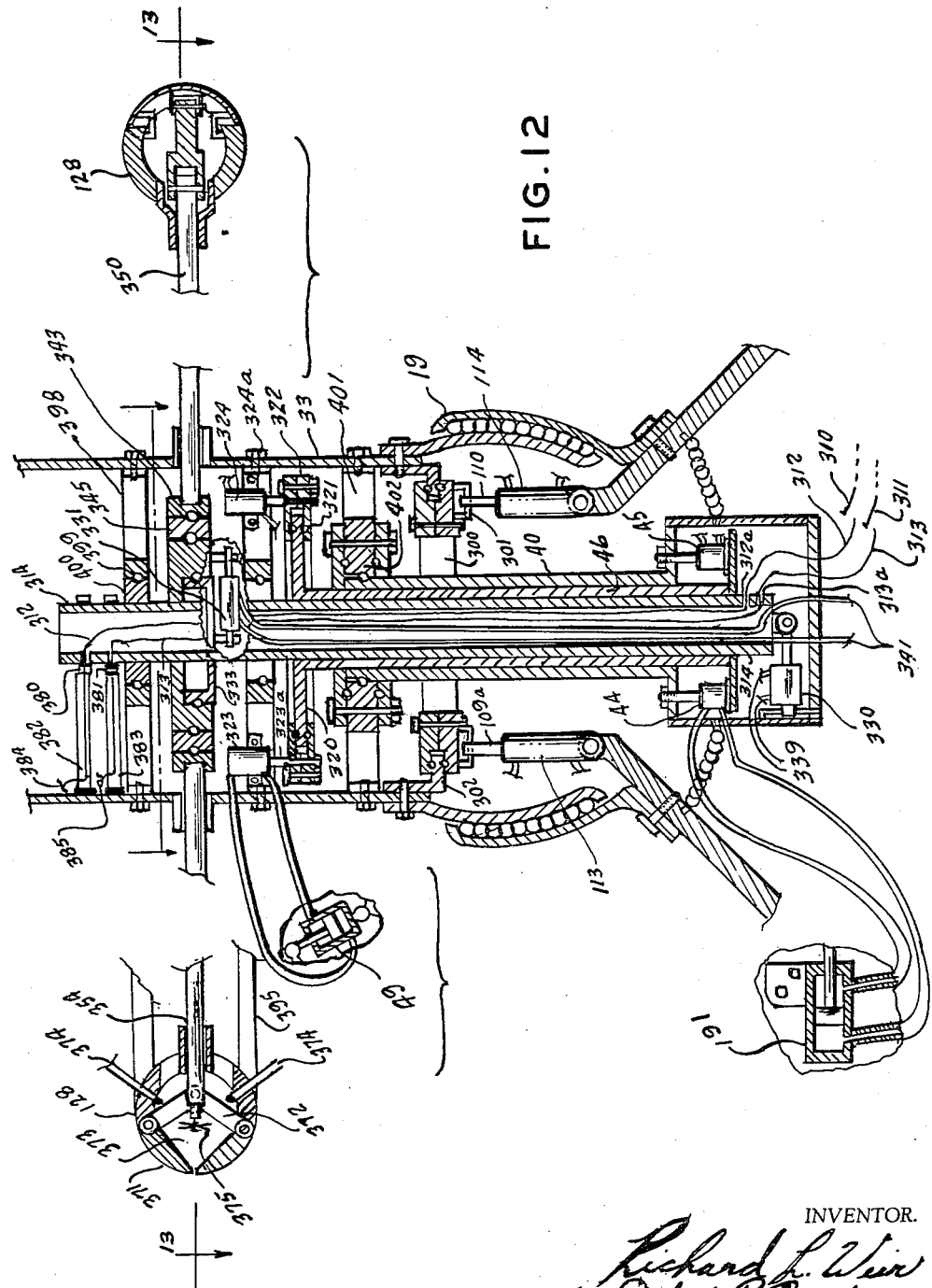
FIGURE 12 is another embodiment of the ball joint construction between the cab and the rotating structure above it.

FIGURES 12 and 13

Referring now to FIGURES 12 and 13, other embodiments of the invention are disclosed. The cylinders 113 and 114 of FIGURE 3 are now placed within the ball joint 19. These cylinders 113 and 114 contain pistons as shown in FIGURE 3, but the rods 109a and 110 are now connected to a ring 300 by staple-like connections 301. The ring 300 has a ball bearing connection with the circular flange 302 which is rigidly connected to the vertical tube 33 heretofore described, and which supports the rotating structure above the cabin 25. Similar cylinders are placed in a vertical plane at 90° to FIGURE 12 in a manner similar to the previous description in connection with FIGURE 3. By the actuation of the pistons in the cylinders 113 and 114 etc., the angular relationship between the upper rotating structure and the cabin 25 may be varied as previously described.

The control of engines 20 and 21 is accomplished by means of the switches 310 and 311 which receive power from any suitable source within the cabin 25 or elsewhere, and these switches energize or deenergize wires 312 and 313 respectively which go through the central portion of the tube 314, through suitable openings 312a and 313a, and pass through the upper part of tube 314 in the upper part of FIGURE 12, where the wires 312 and 313 are connected to the engines 20 and 21, by slip ring connections to be described. Wire 312 controls the fuel feed into the engines and the wire 313 may control the spark in the engines. Other control wires may be provided for any other controls necessary to the proper operation of the engines 20 and 21.

The pistons 44 and 45 in FIGURE 12 control the foils 55, 56, etc., in a slightly different manner. The tube 46 is raised and lowered by the operation of pistons in the cylinders 44 and 45 as previously described. The raising and lowering of the tube 46 in turn raises and lowers the platform 320 which has a ball race connection 321 with the ring 322. The ring 322 when raised and lowered by the platform 320 likewise raises and lowers the connecting rods 323a and 324a of pistons in the cylinders 323 and 324, which are connected to the pistons 49 which actuate the foils as indicated in FIGURES 6 and 7, in a manner previously described. This construction replaces the cable construction 47 and 48 previously described in connection with FIGURE 5.

The cylinders 330 and 331 vary the eccentricity of a structure to control various mechanisms within the rotating structure above the cabin 25, such as structures within the outer ring 128 of the foil disc. The cylinder 330 controls the condition of the eccentric 333 which is fixedly connected to the tube 314. The body 331 of the cylinder 331 is connected to the eccentric 333, while the connecting rod 335 is connected to the eccentric 337. Thus, actuation of the piston within cylinder 330 through fluid cables 339 connected to a cylinder 191 (of FIGURE 5B) partially rotates the tube 314 and thus establishes the position of the eccentric 333. Actuation of the piston within the cylinder 331 by the flow of fluid through the lines 341 (by a structure of FIGURE 5B) rotates the eccentric 337 in relation to the eccentric 333. The amount of rotation thus produced is sufficient to place the eccentrics so the outer ring 343 is coaxial with the tube 314, or is eccentrically displaced therefrom, depending upon the actuation of the pistons within the cylinders 330 and 331. The ring 333 may have a double ball race construction 345 interposed between the inner surface of ring 343 and the outer surface of eccentric 337. A single ball race 347 may be interposed between the eccentrics 333 and 337 instead.

*Vanes 361, FIGURES 12 and 13*

Various radially disposed rods 350 through 357 may be connected to the ring 343 at their inner ends, and may be connected to various devices within or on the ring 128 for the purpose of affecting the flight of the machine. For example, the rod 350 may be connected to a link 360 which in turn is connected near the center of the foil or vane 361, which is hinged at 362. Inward movement of the rod 350 causes the end 353 of the vane 361 to move outwardly and thus present a surface to the atmosphere which affects the flight of the machine. Several vanes of this type may be placed around the periphery of the ring 128 and may be connected to various of the rods 350 to 357 as desired. By this construction, directional movement can be given to the machine, since the vanes 361 would always be folded in into the ring 128, when the ring 342 is coaxial with the tube 314. However, when the ring 343 is eccentrically displaced, the vanes 361 will extend outwardly from the ring 128 at certain arcs of the turning movement of the ring 128 and will thus impart a sidewise directional impulse to the flight of the machine. Control of the flow of the fluid in the cylinders 330 and 331 by mechanisms such as shown in FIGURE 5B may thus be used to control the directional flight of the machine by the position of the vanes 361.

Figure 21:
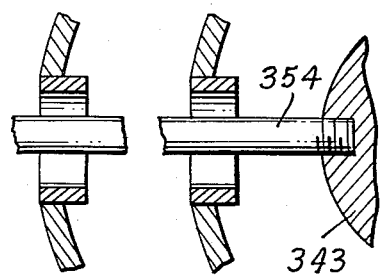
FIGURE 21 is an enlarged fragmentary view similar to FIGURE 13 illustrating certain features of this invention.

The rods 350–357 as well as the other push rods of this invention are loosely carried by the sleeves telescopically receiving the same as illustrated in FIGURE 21 whereby the push rods 350–357 will not bind when the eccentric 343 is moved.

*Jets 370, FIGURES 12 and 13*

Additionally, or in lieu thereof, any one or more of the rods 350 to 357 may control the operation of a ram jet engine 370, of which there may be several around the periphery of the ring 128. The jet engine 370 is provided with vanes 371 which are actuated by operation of the radial rod 354 or similar rod. The vanes 371 are opened by the link and slot construction 372, by the inward and outward movement of the rod 354, or similar rod, just after the explosion or burning takes place in the chamber 373 when fuel is introduced through the fuel lines 374 and when the spark is formed at the igniters 375. The fuel is fed by the actuation of the solenoid valve construction from the electrical source 376 just prior to the closing of the contacts 377. The feed of electrical power to this construction is substantially the same as previously described in connection with the engines 20 and 21, which are fed from the electric line 312 and 313 through the slip rings 380 and 381 which are connected to slip rings 382 and 383 carried by the rotating tube 33, and which slip rings have connectors 384 and 385 leading to the necessary controls in the engines 20 and 21. The slip rings replace cables 36 and 37. Similar slip ring constructions can be provided for the control of the ignition within the engine or chamber 373 just described. The contacts 377 have a movable contact 390 carried by rod 354 and a stationary, or spring supported, contact 391 carried by ring 128. These contacts are closed by the radial movement of the rod 354 at the proper time during the rotation of the ring 128. By movement of the eccentrics 33 and 337, it is possible to determine during what portions of the rotation of the ring 128 the explosions shall occur. Thus the directional flight of the machine may be governed solely by the operation of of these jet engines, or in conjunction with the vane construction 361 previously described.

The air pressure within the chamber 373 is produced by the action of the vanes 60 through 75 which produces the super atmospheric pressure in the space just below the fan at the top of the machine. The tubes 395 are connected to the super atmospheric pressure space and thus produce such pressure within the chamber 373 sufficient to cause an explosion or burning to take place. Centrifugal force acting on the air in the tubes 395 increases the compression pressure of the air in the combustion chamber 373.

The upper end of the tube 314 is maintained coaxial with respect to the rotating tube 33 by means of the spider 398 which is rigidly secured to the tube 33 which has a ball race engagement 399 with the ring 400 rigidly secured to the tube 314. Likewise the tube 40 is maintained coaxial with the rotating tube 33 through the medium of the spider 401 rigidly secured to the tube 33 and the ball race construction 402 rotationally connected with the stationary tube 40.

*Figures 17–19*

A double eccentric construction somewhat similar to that previously described in connection with the FIGURES 12 and 13 is used in FIGURES 17, 18 and 19 to actuate an electrical system for controlling the intermittent explosions taking place in the one or more combustion chambers 410 arranged around the ring 128 or other rotating ring in the machine. Directional flight is given to the machine in this manner. The tube 314, eccentrics 333 and 337, cylinder 331, and cylinder 330, not shown in these figures, operate as previously described in connection with FIGURES 12 and 13, to determine the coaxialness or eccentricity of the ring 343.

For convenience, in FIGURES 17, 18 and 19 the double ball race 345 of FIGURES 12 and 13 has been omitted, and a single ball race 345a has been substituted in lieu thereof.

The construction is such that when the ring 343 is coaxial with the tube 314, the fuel chambers 410 are all simultaneously fired at each quadrant of rotation of the ring 128. The eccentricity of the ring 343 may be so regulated that any one or plurality of the chambers 410 is, or are, exploded only during some selected quadrant or quadrants during rotation of ring 128, thus to determine a directional flight of the machine. The details are as follows.

Air under pressure is fed through the tube 395, as in FIGURES 12 and 13. Air flows through the spring pressed valves 412 until such time as the pressure in chamber 410 is substantially equalized with the pressure in tube 395, whereupon the valves 412 close. Fuel is then injected into the chamber 410 through the tube 414 under the control of a solenoid valve 416 at certain selected times during the rotation of the ring 128. At a suitable time thereafter, the igniter 418 is energized to ignite the charge, whereupon the spring pressed vanes 420 yield outwardly, and allow a discharge through the opening 422 into the atmosphere. If desired, a rotationally adjustable nozzle 424 may be provided to give the impulse a rotary direction, or an upward or downward direction, as desired. Rotational adjustment of nozzle 424 may be manual or by a solenoid, not shown, and controlled from the cabin 25.

The rotating tube 33 carries the insulated spring pressed contact 430. Disc 432 is fixedly secured to the stationary tube 314, which is angularly adjustable as previously described. The disc 432 carries a plurality, such as four, insulated contacts 434a, 434b, 434c and 434d. The contact 430 contacts the coaxial stationary contacts 434a–434d, at each quadrant during the rotation of the ring 128. At this time, the contact breakers 436a, 436b, 436c and 436d are all in closed position (when ring 343 is coaxial with tube 314), so that an electrical impulse is directed to four explosion chambers 410 at each quadrant of rotation of ring 128. For this purpose a power source, diagrammatically indicated as battery 438, may be placed in the cab 25, or anywhere on the machine, and is connected by the lead 440 through the tube 314 to the distributing connector wire 442 which is connected with each of the contacts 434a–434d. All of these contacts engage the contact 430 in the same manner whether the ring 343 is coaxial or eccentric with respect to the tube 314. Hence the contact 430 is energized at each quadrant of the rotation of the ring 128. However, the contact breakers 436a–436d may be prevented from closing at any one or more of the quadrants by the eccentricity position of the ring 343, determined by the position of the eccentrics 333 and 337 as previously described. For example, the eccentricity of ring 343 may be displaced to its maximum position at the point where breaker 436c is substantially 180° opposite from the contact 430. Under these conditions, the contacts 440' are closed and permit the electrical impulse to flow from contact 430 through the wire 444, wire 446, contacts 440' and 442', wire 448 to the solenoid valve 416 to allow a fuel charge to be sent through the tube 414 to chamber 410. A slight delay action in the solenoid valve 416 causes the shaft 450 to move outwardly an instant later, and to close the contacts 452. This permits current to flow through the wire 454 to the vibrator 456 which sends a vibrating current through the transformer 458 and a high tension current through the wires 460 to the igniter 418 and thus ignite the charge at the selected quadrant during the rotation of ring 128.

If necessary, a holding coil may be provided to connect the line 454 with the source of supply 438 a short time beyond the contact time of 430 in a manner readily understood in the electrical art. The purpose of this would be to insure the firing of the charge in chamber 410 if it had not been properly fired during the contact period of 430. The eccentricity of the ring 343 may be so adjusted, that two of the chambers 410 or more may be fired selectively, instead of all of them, in order to produce the desired effect during the rotation of the ring 128 to give a horizontal, upward or downward directional impulse, as desired.

The contact breakers 436a–436d, and similar contact breakers shown in FIGURES 14, 15 and 16, include a compression spring 462, FIGURE 20, which presses against the disc 464, carried by the sleeve 464a. The disc 464 presses against the bellows 466 which carries the disc 468 in which are mounted the connected double contacts 440', which are insulated from the disc 468. The tube 470 carries the double insulated contacts 442 which are connected to the wires 446 and 448 leading out of the contact breaker. When the rod 354, or corresponding rods 350–357, is moved radially outward, it pushes the contacts 440' against the contacts 442' and thus permit a current to flow through the wires 446 and 448. The sleeve 464a is slidably mounted on tube 470.

*Figures 14–16*

In the modification shown in FIGURES 14–16, a sustained burning action may be produced in the chamber 480, or four such chambers, located at 90° intervals on the ring 128 or any other rotating ring. This sustained fuel burning may be so controlled that it continues throughout the entire revolution of the ring 128, or it may be limited to any one quadrant or more by the selection of eccentricity or coaxialness of the ring 343 in a manner to be now more fully described. Directional flight is controlled by the selection.

The tubes 314 and 33, the eccentrics 333 and 337, the contact breakers 436a–436d, cylinder 331, etc., as is obvious, are substantially the same as previously described with respect to FIGURES 17–20.

Current may be supplied from any suitable source, such as battery 438, in the cab or a magneto on the rotating structure of the machine. For example, current may be led up through the stationary tube 314 substantially as was done in FIGURES 17—18, and then through a slip ring construction 482 which may be carried by the rotating tube 33 and insulated therefrom and which contacts an insulated slip ring construction 483 carried by the tube 314. The ring 482 can be connected to the wire 448 and the ring 483 can be connected to the power source. The wire 448 is connected to the contact breaker 436c, or other contact breaker as the case may be, and from thence through the wire 446 to the wire 484 and solenoid valve 486 for feeding fuel through the tube 414. A similar wire 484a, solenoid valve 486a and 414a may be provided at the other side of the combustion chamber 480. The combustion chamber 480 may be closed by the spring loaded gates 420 which are urged together by the tension springs 488 and levers 448a in a manner similar to the construction in FIGURES 17–19. The wire 446 is also connected to the vibrator 456, which in turn is connected to the transformer 458 having its high tension leads 460 connected to the igniter 418. The tube 395 feeds high pressure air into the chamber 480, where the fuel, which is more or less continuously fed into the chamber 480, is ignited by the continuously operating igniter 418 to produce a continuous flame past the spring loaded gates 420. If desired, the gates 420 may also have a vane construction with a downward or upward slant to provide upward or downward lifting force as the ring rotates. When the ring 343 is coaxial with the tube 314, the burning action in chamber 480 is continuous throughout the entire revolution of the ring 128. However, when the eccentricity of the ring 343 is varied by the action of the cylinder 331, the burning action takes place only during part of the revolution, either a large or small part of the revolution, as desired, depending on the eccentricity and other factors entering into the construction. If desired, four such chambers 480 may be placed 90° apart along the ring 128, and these can be connected to the four contact breakers 436a–436d, as is understood. The contact breakers 436a, 436b and 436d may be connected to the source of supply 438 in the same manner as the contact breaker 436c.

The relatively constant combustion chamber construction of FIGURES 14–16 may be placed on the same machine as the intermittent action fuel burners of FIGURES 17–19. They may be mounted on the same ring 128, or on different rings of similar construction. The action of the combustion chambers 480 is such that they can impart a horizontal sidewise movement to the machine, combined with a lifting or tilting action, depending on the vane construction of the gates 420.

Résumé

The cabin 25, in all of the embodiments, can be axially tilted with respect to the rotating structure above it. Such tilting action may be used to govern the flight of the machine.

The rotating part of the machine includes an upper fan having vanes or blades 60–75 to provide lift for the machine and a downward air pressure for combustion chambers, directional vanes, etc., which are mounted below the fan.

Rotation is imparted mainly by the jet engines 20 and 21 which have downward and tangentially directed discharges. They receive fuel from the tank 22 and lines 22a and are fired in the usual manner, as diagrammatically indicated.

The rotating part of the machine also includes a combined gyroscopic, adjustable foil ring structure, including rings 128 and 129, fixed foils 78–85, adjustable foils 51–58, and means for adjusting the foils from the cab. The gyroscopic action obtained by adjusting the axis of the cab in relation to the axis of rotation of rings 128 and 129 produces a directional component in the travel of the aircraft. This action is in part due to the gravitational force tending to keep the axis of the cab vertical. This gyroscopic action is combined also with the action of the adjustable foils 51–58, to regulate the directional travel of the machine.

In the embodiments shown in FIGURES 12–20, other forces are added to the gyroscopic ring structure. In FIGURES 12 and 13, the ring 128 is provided with adjustable vanes 361 which are adjustable to open during selected arcs of rotation of ring 128. This action produces a sidewise component of force for directional control. The ring 128 is also provided with one or more explosion or combustion chambers 373, which can be adjusted to produce combustion only during certain selected arcs of rotation, to produce a sidewise component of force. The vanes 361 and the combustion chambers 373 may be used independently or jointly to govern the flight of the machine.

In the embodiments of FIGURES 14–20, the combustion engines or chambers 480 and 410 are controlled by electrical systems, so the combustion or explosion may be produced only during selected arcs of rotation, to govern the direction of flight. The electrical impulses may be distributed to the chambers by central distributing means placed around the axis of rotation.

In all of the embodiments of FIGURES 12–20, the regulation of the vanes 361, and of the combustion chambers 373, 410 and 480 may be regulated by variation of the eccentricity of the ring 343 by means of the relative turning of the eccentrics 333 and 337, which can be governed from the cab by hydraulic systems.

The downward pressure of the air produced by the fan blades 60–75, and the foils 51–58 is used to produce combustion in engines 20 and 21, and in combustion chambers 373, 410 and 480. The downward flow of air is also used to prevent rotation of the cab 25 by means of the control flaps 91 and 92, and is also used to produce a horizontal component by the rudders 124 and 125.

The outward movement of the vanes 361, FIGS. 12 and 13, during a selected arc of rotation produces a sidewise or directional movement of the aircraft by reaction with the atmosphere. Also this selective eccentricity of a weight during a selected arc of rotation may be used as a force to produce a sidewise or directional flight movement of the aircraft.

This application is a continuation-in-part of my copending application S.N. 581,952, filed May 1, 1956, now abandoned, for Rota-Plane.

It is to be understood that the form of my invention herewith shown and described is to be taken as a preferred example of the same, and that various changes in shape, size and arrangements of parts may be resorted to without departing from the new basic concepts expressed.

I claim:

1. In an aircraft, a rotatable, disc-like gyroscopic air lift structure having an axis of rotation, said structure comprising an outer annular shutter-like section and an inner centrally disposed fan-like section, propulsion means carried by said structure for rotating said structure, said fan-like section supplying air to said propulsion means, a cab relatively non-rotatable with respect to said axis of rotation of said structure and flexibly secured to said structure, and means operatively interconnected to said structure to vary the relative direction of the axis of rotation of the air lift structure with respect to said cab.

2. In an aircraft, a rotatable, disc-like gyroscopic air lift structure having an axis of rotation, said structure comprising an outer annular shutter-like section and an inner centrally disposed fan-like section, propulsion means carried by said structure for rotating said structure, said fan-like section supplying air to said propulsion means, a cab relatively non-rotatable with respect to said axis of rotation of said structure, a ball-joint suspension means between said cab and structure, and means operatively interconnected to said structure to vary the relative direction of the axis of the structure with respect to said cab by relative movement in the ball-joint suspension means.

3. In an aircraft, a rotatable air lift structure having an axis of rotation, a cab relatively non-rotatable with respect to said axis of rotation of said structure and secured to said structure, combustion chambers carried by said structure and thus being rotated relative to said cab, means operatively interconnected to said chambers to cause combustion in said chambers when said chambers are respectively rotated to a predetermined rotational position relative to said cab and to cause non-combustion when said chambers are respectively not in said predetermined rotational position, and means operatively interconnected to said first-named means to vary said predetermined rotational position relative to said cab.

4. An aircraft according to claim 3, in which said last-named means includes two nested eccentrics relatively rotatable with respect to each other, one of said eccentrics being operatively interconnected to said first-named means and the other eccentric being operatively interconnected to said cab.

5. In an aircraft, a cab, a rotatable air lift structure connected to and relatively rotatable with respect to said cab, said structure having a circular outer periphery, a radially movable vane on said structure and normally defining part of said periphery of said structure, means operatively interconnected to said vane to move said vane radially outwardly when said vane is in a predetermined rotational position relative to said cab and inwardly when said vane is not in said predetermined rotational position, and means operatively interconnected to said first-named means to vary said predetermined rotational position relative to said cab.

6. An aircraft according to claim 5 in which said last-named means includes two nested eccentrics relatively rotatable with respect to each other, one of said eccentrics being operatively interconnected to said first-named means and the other eccentric being operatively interconnected to said cab.

7. In an aircraft, a rotatable structure having an axis of rotation, a cab relatively non-rotatable with respect to said axis of rotation of said structure, a combustion chamber rotatable with said structure and thus being rotatable relative to said cab, means operatively interconnected to said chamber to cause combustion to take place in said chamber when said chamber is in a predetermined rotational position relative to said cab and no combustion to take place when said chamber is not in said predetermined rotational position, and means operatively interconnected to said first-named means to vary said predetermined rotational position relative to said cab.

8. An aircraft according to claim 7, in which said first-named means includes electrical means operatively interconnected to said chamber.

9. An aircraft according to claim 7 in which said last-named means includes an eccentric with adjustable eccentricity to vary said predetermined rotational position, said eccentric being operatively interconnected to said cab.

10. An aircraft according to claim 7, in which said first-named means includes electrical means interconnected to said chamber and said last-named means includes an eccentric with adjustable eccentricity, said eccentric being operatively interconnected to said electrical means to activate the same and being operatively interconnected to said cab.

11. In an aircraft, a rotatable structure having an axis of rotation, a cab relatively non-rotatable with respect to said axis of rotation of said structure, a compression combustion chamber rotatable with said structure, means operatively interconnected to said chamber to feed air through a tube radially into said combustion chamber to place said air under centrifugal compression, said means having an air inlet disposed on the same side of said axis of rotation as said combustion chamber so that the air entering said inlet will not be subject to centrifugal force tending to force the same away from said combustion chamber.

12. An aircraft according to claim 11 in which a fan carried by said structure is used to assist said centrifugal compression of said air.

13. In an aircraft, a rotatable air lift structure having an axis of rotation, said structure having an outer gyroscopic ring, said ring having a plurality of radially disposed vanes, at least some of said vanes being movable, said structure having a centrally disposed fan-like section, propulsion means carried by said structure for rotating said structure, said fan-like section supplying air to said propulsion means, a cab relatively non-rotatable with respect to said axis of rotation of said structure and secured to said structure, and means operatively interconnected to said movable vanes to selectively position the same relative to said structure.

14. In an aircraft, a rotatable air lift structure having an axis of rotation, said structure including a centrally disposed fan-like section and an outer gyroscopic ring interconnected to said fan-like section, propulsion means carried by said structure for rotating said structure, said fan-like section supplying air to said propulsion means, and a cab relatively non-rotatable with respect to said axis of rotation of said structure and secured to said structure.

15. In an aircraft, a rotatable air lift structure having an axis of rotation, said structure having an outer annular shutter-like section and an inner centrally disposed fan-like section, propulsion means carried by said structure for rotating said structure, said fan-like sections supplying air to said propulsion means and a cab relatively non-rotatable with respect to said axis of rotation of said structure and secured to said structure.

References Cited in the file of this patent

UNITED STATES PATENTS

| 1,091,315 | Felten | Mar. 24, 1914 |
| 2,364,496 | Vogel | Dec. 5, 1944 |
| 2,684,212 | Vanderlip | July 29, 1954 |
| 2,738,844 | Nagler | Mar. 20, 1956 |
| 2,814,349 | Berry | Nov. 26, 1957 |
| 2,927,647 | Serriades | Mar. 8, 1960 |
| 2,942,672 | Serriades | June 28, 1960 |

FOREIGN PATENTS

| 243,783 | Germany | Oct. 18, 1908 |
| 588,392 | Germany | Nov. 6, 1931 |